United States Patent Office 3,358,052
Patented Dec. 12, 1967

3,358,052
POLYURETHANE COMPOSITION CONTAINING
0.2 TO 5% POLYOLEFIN OR POLYSTYRENE
William Archer, Jr., Eighty-Four, and Samuel Steingiser, Bridgeville, Pa., assignors to Mobay Chemical Company, Pittsburgh, Pa., a corporation of Delaware
No Drawing. Filed May 4, 1964, Ser. No. 364,817
21 Claims. (Cl. 260—859)

This invention relates to elastomeric polyurethanes and to improved processing of the same. More particularly, it relates to polyurethane elastomers having improved melt flow and mold release properties.

Heretofore in the processing of elastomeric compositions including polyurethane elastomers, difficulties have been encountered, especially with high molecular weight products, wherein suitable flow properties are not obtainable and mold release is very poor. Such a problem has previously been dealt with by including flow agents in these elastomeric products. Some such compounds in common use are stearic acid and the stearates of zinc, barium, aluminum, calcium and so on. However, although these compounds are suitable for other types of elastomeric materials because they are inert therein, they are disadvantageous for use in polyurethane elastomers since they promote the breakdown of the polyurethane polymer, especially in the presence of water.

Some compounds which have been alternatively proposed as lubricants for polyurethanes, therefore, are the natural waxes and oils, but the use of such agents is not satisfactory since they tend to migrate out of the elastomer and form a coating on the surface of the product. This blooming is not only detrimental to the appearance of the product, but it may also impair its desirable physical and mechanical properties. In addition, waxes are so incompatible and difficult to incorporate into a polyurethane elastomeric composition that their use is not practical.

Therefore, it is an object of this invention to provide a process for the preparation of polyurethanes having improved flow properties which is devoid of the foregoing disadvantages. It is a further object of this invention to provide polyurethanes containing an inert agent which acts as a lubricant and mold release agent in the processing of polyurethane elastomers. It is a still further object of this invention to provide an inert flow agent for the processing of a polyurethane which is compatible with the elastomeric polyurethane product and has a sufficiently high melt index to facilitate the flow and mold release of the polyurethane elastomeric product. A still further object of this invention is to provide an internally lubricated polyurethane plastic which does not possess an impaired physical appearance or degraded physical and mechanical properties.

These and other objects which will become apparent from the following description are accomplished in accordance with the invention, generally speaking, by providing a solid polyurethane polymer having a hardness as measured on the Shore hardness scale of between about 75A and about 60D, in which is substantially uniformly dispersed from about 0.2% to about 5% by weight of a polymer such as a polyolefin, polystyrene, or mixtures thereof, which polymers are solid at room temperature and have a melt index of at least about 115 as defined below, but preferably at least about 1000, and a process for incorporating said polymers into the polyurethane.

The melt index as referred to in conjunction with this invention is a mesaurement to determine the melt behavior of a polymer, thus indicating the degree of ease with which the polymer flows. Such measurements are made in a capillary rheometer as described in Journal of Polymer Science, Part A, Vol. I, pages 3395–3406, 1963. The specific melt-index determinations referred to hereinafter were run at one of the two following conditions, depending upon the molecular structure and molecular weight of the polyurethane:

(1) 360° F.; 100 lb. load; orifice L/D of 4
(2) 400° F.; 500 lb. load; orifice L/D of 15.

This procedure was adapted from ASTMD-1238-62T. The values for the melt index thus arrived at are expressed in grams/10 minutes.

In a comparison of the results of tests of various samples having no additive to improve the flow and those samples in which one of the polymers of this invention or a mixture thereof is incorporated in amounts between 0.2 and 5%, the collated data shows a decided improvement in the flow properties of the polyurethane elastomers having the polymers of this invention dispersed therein over those in which no such additive is included. For example, a polyurethane control sample has a melt index under condition (1) above stated of 15. The same polyurethane elastomer having dispersed therein 1% by weight of polyethylene having a melt index of about 2400 has a melt index of 37 under the identical conditions.

The table below illustrates the tremendous improvement in the flow properties of polyurethane elastomer compositions when from about 0.2 to 5% of a polymer such as polyethylene, polypropylene, polybutylene, polystyrene, or mixtures thereof are added to these compositions. Urethane A in the table is that fabricated in Example 1; Urethane B is that fabricated in Example 5.

| Urethane A or Urethane B | Additive, and percent by weight | Melt Index | Melt Index Test Condition |
|---|---|---|---|
| B | Control (no additive) | 14 | (2) |
| | Polypropylene, 1% | 60 | (2) |
| A | Control (no additive) | 15 | (1) |
| | Low density polyethylene, 1% | 29 | (1) |

In the process of this invention, the polymer which acts as an internal lubricant for the transport of the polyurethane melt also acts as a mold release agent for the removal of the product in operations such as calendering, injection molding, extruding and the like.

Any suitable compound having a melt index of at least about 115 under the conditions defined above, but preferably having a melt index of at least about 1000 and which is generally a solid at room temperature may be used. It is to be understood that the designation of the melt index at 115 is under condition (1) defined hereinbefore and that any determination of melt index under condition (2) will always give a higher value for the melt index of the identical polymer. Therefore, in the remainder of the specification and in the claims, the designation of melt index shall refer to the melt index as measured under condition (1) hereinbefore defined. Some polymers specifically contemplated as suitable for use as flow agents in the process of this invention are the polyolefins, such as polyethylene, polypropylene, polybutylene and the like, polystyrene and mixtures thereof.

It has been found that the use of these polymers as lubricating agents is advantageous for all types of polyurethane elastomers including casting compositions, thermoplastics and millable gums. The additives are chemically inert to the polyurethanes and are not detrimental to the appearance of the product in any way. However, it is required that one use the prescribed quantity of the polymer to suit the process since an excess will not further expedite the processing of the polyurethane elastomer but will cause blooming. In other words, the polymer will appear as a film or skin on the outside of the molded or calendered or otherwise processed product. Further, if too much of the polymer or a mixture of polymers is added to the polyurethane, the polymer will plate out, for instance, on the calender rolls in a calendering operation and ruin the surface of the product. In addition, a marked stiffening of the polyurethane may occur. However, within the ranges of about 0.2 to about 5% by weight of the polymer, calculated on the total weight of polyurethane elastomer, many advantages are readily apparent. For the very best results, however, it is preferred that from about 0.5 to 2.0% by weight of the polymer or a mixture of polymers be used.

In a preferre embodiment of this invention, the lubricating polymer dispersed in the polyurethane elastomeric composition is a polyolefin; preferably a polyethylene having a molecular weight of from about 1000 to about 500,000 which is a solid at room temperature and which is incorporated into the polyurethane in amounts of from about 0.2 to 5% by weight calculated on the total weight of the polyurethane elastomer, but most perferably in amounts of from about 0.5 to 2% by weight.

Therefore, when polyethylene or any of the other polymers of this invention are incorporated into a polyurethane elastomer in a Banbury mixer, for example, superior cleaning of the rotors is immediately noticeable, and a decrease in consistency is measured when using the Banbury mixer attached to a Brabender plastograph. This plastograph is described by W. T. Blake, "Measuring of Processibility of Elastomers," Rubber Age, January 1962. In molding a polyurethane containing one of these polymers, very good release properties are also noted. It has become apparent that these polymer additives, being chemically inert in elastomeric polyurethanes do not have an adverse effect upon the hydrolysis resistance of the samples as do commonly used lubricant additives such as stearic acid or metal stearates. This advantage is illustrated in the following table wherein Urethane A is that which is fabricated in Example 1.

| | Original tensile strength, p.s.i. | Percent Retentions of original tensile strength after aging 8 hrs./250° F. 100% relative humidity |
|---|---|---|
| Urethane A (no additive) | 4,500 | 76 |
| Urethane A plus 2% stearic acid | 4,800 | 33 |
| Urethane A plus 2% zinc stearate | 3,650 | 28 |
| Urethane A plus 5% polyethylene | 4,550 | 80 |

In the process of this invention, the lubricating polymer or a mixture of polymers can be added to the polyurethane at any desired point in the fabrication of the polyurethane product and by any desired means. For example, the polyolefins and polystyrenes may be mixed with any of the components of the polyurethane reaction mixture such as the prepolymer composition or it may be added after the components have been mixed, but before the final product of the reaction is obtained; they may also be added after the polyurethane elastomer has already been prepared. In the latter instance, the lubricating polymer may be blended with the polyurethane in a mixer while both of these components are in powder or granulate form, or the polymer and the polyurethane may be banburied together. In addition, although it is generally convenient to add the lubricating polymers of this invention or mixtures thereof, to the polyurethane elastomeric composition in granular or particulate form, in some cases, as where casting compositions are being fabricated, it may be desirable and even necessary to add the lubricating agents of this invention in liquid form. In such instances, these polymers may be heated to a melt and added to the polyurethane at any desired point in the process of preparation of the polyurethane in that form. The polymer may also be worked substantially uniformly into the polyurethane while it is being milled, after which the polyurethane is sheeted off and shaped into the desired final product. The polyurethane containing the lubricating polymer may also be extruded to effect a blend of the polymer in the polyurethane and thus achieve ease of handling by the superior lubricity obtained.

The internally lubricated product thus obtained can then be calendered, injection molded, extruded, or processed in any desired manner with good flow and good release properties. The polyurethane polymer remains undegraded by the polymeric lubricant while the products are noted to be vastly improved with regard to hydrolysis resistance over any products obtained with the commonly used stearate lubricants.

In the preparation of the polyurethane polymers an organic compound containing active hydrogen atoms which are reactive with —NCO groups is intimately mixed with an organic polyisocyanate, and if desired, a chain extending agent.

Any suitable organic compound containing active hydrogen atoms which are reactive with —NCO groups, such as, for example, hydroxyl polyesters, polyhydric polyalkylene ethers, polyhydric polythioethers, polyacetals and the like may be used.

Any suitable hydroxyl polyester may be used, such as, for example, the reaction product of a polycarboxylic acid and a polyhydric alcohol. Any suitable polycarboxylic acid may be used in the preparation of the hydroxyl polyester, such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis - (hydroxymethyl - cyclohexane) and the like. The hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters, and the like. Any suitable polyester amide may be used, such as, for example, the reaction product of a diamine or an amino alcohol with any of the compositions set forth for preparing polyesters. Any suitable amine may be used, such as, for example, ethylene diamine, propylene diamine, tolylene diamine and the like. Any suitable amino alcohol such as, for example, β-hydroxy ethyl amine and the like may be used. Any suitable polyester urethane may be used such as, for example, the reaction product of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups, such as, for example, the reaction product of an ether glycol and a polycarboxylic acid, such as those mentioned above with relation to the preparation of polyesters. Any suitable ether glycol may be used such as, for example, diethylene glycol, triethylene glycol, 1,4-phenylene-bis-hydroxy-ethyl ether, 2,2'-diphenyl propane-4,4'-bis-hydroxyl ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethyol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process, such as, for example, the process described in Wurtz in 1859 and in the Encyclopedia of Chemical Technology, volume 7, pages 257–262, published by Interscience Publishers in 1951 or in U.S. Patent 1,922,459.

Any suitable polyhydric polythioether may be used, such as, for example, the reaction product of one of the aforementioned alkylene oxides used in the preparation of the polyhydric polyalkylene ether with a polyhydric thioether, such as, for example, thiodiglycol, 3,4'-dihydroxy propyl sulfide, 4,4'-dihydroxy butyl sulfide, 1,4-(β-hydroxy ethyl) phenylene dithioether and the like.

Any suitable polyacetal may be used, such as, for example, the reaction product of an aldehyde with a polyhydric alcohol. Any suitable aldehyde may be used, such as, for example, formaldehyde, paraldehyde, butyraldehyde and the like. Any of the polyhydric alcohols mentioned above with relation to the preparation of hydroxyl polyesters may be used.

The organic compound containing active hydrogen atoms should preferably be substantially linear or only slightly branched and have a molecular weight of at least about 600 and for best results, a molecular weight of from about 1800 to about 3000, an hydroxyl number of from about 75 to about 35, but not more than about 187, and an acid number less than about 2. For best results linear hydroxyl polyesters of polyalkylene ether glycols should be used.

Any suitable organic polyisocyanate may be used in reaction with the organic compound containing active hydrogen atoms to produce thermoplastically processable polyurethane polymers, such as, for example, ethylene diisocyanate, ethylidene diisocyanate, propylene diisocyanate, butylene diisocyanate, hexamethylene diisocyanate, cyclopentylene - 1,3 - diisocyanate, cyclohexylene - 1,4 - diisocyanate, cyclohexylene - 1,2 - diisocyanate, 2,4 - toluylene diisocyanate, 2,6 - toluylene diisocyanate, dimeric toluylene diisocyanate, 4,4'-diphenylmethane diisocyanate, 2,2 - diphenylpropane - 4,4' - diisocyanate, p-phenylene diisocyanate, m-phenylene diisocyanate, xylylene diisocyanate, 1,4 - naphthylene diisocyanate, 1,5-naphthylene diisocyanate, diphenyl - 4,4' - diisocyanate, azobenzene - 4,4' - diisocyanate, transvinylene diisocyanate, diphenylsulphone - 4,4' - diisocyanate, dichlorohexamethylene diisocyanate, furfurylidene diisocyanate, 1 - chlorobenzene - 2,4 - diisocyanate, 4,4',4'' - triphenylmethane triisocyanate, 2,4,6-tolylene triisocyanate and the like. It is preferred that aromatic diisocyanates be used and for best results, 4,4'-diphenylmethane diisocyanate or tolylene diisocyanate has proven to be especially suitable.

Any suitable chain extending agent containing active hydrogen atoms which are reactive with —NCO groups and having a molecular weight less than about 500 may be used in the formation of the polyurethane such as, for example, ethylene glycol, propylene glycol, butylene glycol, 1,4-butanediol, butenediol, butynediol, xylylene glycol, amylene glycol, neopentyl glycol, 2,3-butanediol, 1,4-phenylene-bis(β-hydroxy ethyl ether), 1,3-phenylene-bis-(β-hydroxy ethyl ether), bis-(hydroxy methylcyclohexane), hexanediol, diethylene glycol, dipropylene glycol, and the like; polyamines, such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3' - dinitrobenzidene, 4,4' - methylene-bis(2-chloroaniline), 3,3-dichloro-4,4'-biphenyl diamine, 2,6-diamino pyridine, 4,4'-diamino diphenyl methane, and the like; alkanol amines, such as, for example, ethanol amine, aminopropyl alcohol, 2,2-dimethyl propanol amine, 3-amino cyclohexyl alcohol, p-amino benzyl alcohol and the like; water, hydrazine, substituted hydrazines, such as, for example, N,N'-dimethyl hydrazine, 1,6-hexamethylene-bis-hydrazine, carbodihydrazide, hydrazides of carboxylic acids, and disulfonic acids, such as, adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omegaamino-capronic acid dihydrazide, gamma-hydroxybutyric hydrazide, bis-semi-carbazide, bis-hydrazine carbonic esters of glycols, such as many of the glycols heretofore mentioned and the like.

The individual reaction components and the proportion in which they are added can be chosen according to the basic properties desired of the end product. However, for the production of thermoplastic polyurethanes it is preferred that the isocyanates be present in an amount at least sufficient to react with all of the active hydrogen atoms present and particularly in an amount such that a slight excess is present based on the active hydrogen atoms present in other reaction components. For best results it is preferred that the —NCO/OH ratio is from about 1.0 to about 1.3.

In the preparation of a thermoplastic polyurethane polymer, the reaction between the active hydrogen atoms and the —NCO groups must be interrupted at some point prior to that at which substantial cross-linking occurs in order to achieve the thermoplastic properties necessary. One method of accomplishing this is to cool the polyurethane reaction mixture beyond the point where further chemical reaction takes place as soon as solidification occurs and it can be easily handled.

The organic compound containing active hydrogen containing groups, the organic diisocyanate, and the chain extender are individually heated to preferably a temperature of from about 60° C. to about 135° C. and then the said organic compound and chain extender are substantially simultaneously mixed with the diisocyanate. In a preferred embodiment, the chain extender and the organic compound containing active hydrogen containing groups, each of which has been previously heated, are first mixed and the resulting mixture is combined with the heated diisocyanate. This method is preferred for the reason that the chain extender and the active hydrogen containing resin will not react prior to the introduction of the isocyanate, and rapid mixing with the diisocyanate is thus facilitated. The mixing of the organic compound having reactive hydrogen atoms, the chain extender and diisocyanate may be suitably carried out by using any mechanical mixer, such as, one equipped with a stirrer which results in intimate mixing of the three ingredients in a short period of time. If the material begins to become too thick, either the temperature may be lowered or a small amount of citric acid or the like of from about 0.001 to about 0.050 parts by weight based on 100 parts of the active hydrogen containing resin, i.e. polyester or the like, may be added to slow down the reaction. Of course, to increase the rate of reaction any suitable catalyst may be added to the reaction mixture, such as, tertiary amines and the like, as set forth in U.S. Patent 2,620,516; 2,621,166 and 2,729,618. The reaction mixture, after complete mixing is next poured onto a table or conveyor and preferably maintained at a temperature of from about 60° C. to about 135° C. and permitted to remain on the table or conveyor until it solidifies into a slab which is still a thermoplastic and can be easily removed and reduced to the desired particle size. To facilitate the ready removal of the material from the hot plate, table or conveyor, the slab may be cut or scored. This cutting or scoring is best done while the reaction mixture on the heated table is still soft, since when the material hardens, it becomes difficult to cut although it can still be readily reduced in size by grinders, choppers or any other equipment known in the industry. The thermoplastic polyurethane thus produced is then added to a Banbury mixer together with about 1% of polyethylene in particulate form, and these materials are intimately mixed to effect a blend which may then be extruded, calendered, injection molded or the like.

The organic compound containing active hydrogen atoms, the polyisocyanate, and the chain extender can also be processed in accordance with what has been called the casting method. In this method, all of the reactants are mixed together and immediately poured while still liquid into a mold having the shape desired. When the composition in accordance with this invention is utilized in this fashion, it is necessary that the polyethylene, polystyrene, or mixtures thereof be incorporated into the composition along with the initial reactants. Thus, for example, one suitable casting composition would comprise a dihydric polyester, an organic diisocyanate, and a chain extender, such as butanediol, and the stated quantity of a suitable polyethylene. In such processing techniques, it may be necessary that the polymeric additive be heated at least until it is in the liquid state. Any suitable casting composition, such as, those disclosed in U.S. Patents 2,729,618 or 2,620,516 may be used.

The compositions in accordance with this invention can also be fabricated into the desired configuration by the millable gum method. In this method, an organic compound containing active hydrogen atoms, an organic diisocyanate, and a chain extending agent are mixed together in proportions such that the active hydrogen atoms are in excess. This intermediate, which is storage stable because of the terminal hydroxyl groups, can be subsequently milled with a further quantity of an organic polyisocyanate to effect a composition which will cure upon the application of heat. This type of material is generally compression molded into the desired configuration. In accordance with this invention, the polyethylene, polystyrene, or a mixture thereof can be incorporated into the polyurethane composition either in the manner mentioned above with regard to the casting method, that is, by including the lubricating polymer at the time of initially mixing the reaction components or it can be incorporated at the time of milling in the additional quantity of polyisocyanate which is done, as stated, shortly before the final cure is achieved as illustrated in Example 4 below.

It can, therefore, be seen that regardless of the manner of fabrication of the particular article, the compositions in accordance with this invention can be used to achieve the desired results, these results being the improved release from those surfaces with which the polyurethane compounds come in contact.

The polyurethane polymers thus prepared in accordance with this invention may be fabricated by injection molding, extrusion, compression molding, calendering, casting, milling and the like, into various final objects such as, for example, ball joints, bushings, shoe soles and heels, shock absorbers, fibers, such as spandex and the like.

The invention is further illustrated but not limited by the following examples in which all parts and percentages are by weight unless otherwise specified.

EXAMPLE 1

To about 100 parts of a hydroxyl polyester having a molecular weight of about 2000, a hydroxyl number of about 56, and an acid number less than one, and prepared by esterification of about 10 mols of adipic acid with about 11 mols of 1,4-butanediol, are added about 9 parts of 1,4-butanediol; to this mixture is added about 40 parts of 4,4'-diphenylmethane diisocyanate. Prior to mixing these ingredients, each is separately heated to about 90° C. Upon the addition of the isocyanate to the polyester-butanediol mixture, mechanical mixing is conducted for a period of about 1 minute to insure the intimate contact of the ingredients. This reaction mixture is then cast onto a heated table and maintained at a temperature of about 100° C. for about 15 minutes. When the reaction mixture solidifies to the point where it can be readily removed and easily chopped, it is removed from the heated table and permitted to come to room temperature. The polymer is then placed on a mill roll at a roll temperature of about 290° to 300° F. and after the material is banded, about 2% polyethylene having a melt index of about 500 under condition (1) is added, calculated on the total weight of the polyurethane, and milling is continued for about 25 minutes or until the polyethylene is dispersed substantially uniformly throughout the polyurethane. The product then releases from the roll with ease and the millability is noted to be good. Without the addition of polyethylene, noticeable sticking to the mill is observed.

EXAMPLE 2

About 100 parts of the polyester of Example 1 are mixed with about 1.73% of polyethylene having a molecular weight of about 2,000 and a melt index of about 10,000 under condition (1) and about 9 parts of 1,4-butanediol; to this is added about 40 parts of 4,4'-diphenylmethane diisocyanate. Prior to mixing these ingredients, each is separately heated to a temperature of about 90° C. Upon the addition of the isocyanate to the polyester-butanediol mixture, mechanical mixing is conducted for a period of about 1 minute to insure the intimate contact of the ingredients. This reaction mixture is then cast onto a heated table maintained at a temperature of about 110° to 115° C. for about 15 minutes. When the reaction mixture solidifies to the point where it can be readily removed and easily chopped, it is scored, removed from the heated table, and permitted to come to room temperature. This material is then introduced into the hopper of an extruder to produce a plurality of strands of uncured polyurethane which are then pelletized and used in shaping and molding processes. It is noted that the polyurethane thus extruded does not stick to the extruder dye, nor is there a build up of the polyurethane at the orifice.

EXAMPLE 3

A solid reaction mixture is prepared as in Example 1, and is then removed from the reaction table, chopped and permitted to cool to room temperature. The chopped polymer is then charged into a Banbury mixer together with 1% of polyethylene having a melt index of about 2500 under condition (1) and these components are mixed to a uniform mass at about 150° C. to 160° C. The blended mass containing the polyethylene releases cleanly from the hot jacket of the mixer whereas a similar polymer charge containing no polyethylene adheres to the mixer walls. The blended mass containing polyethylene is then sheeted out on a 2-roll rubber mill at about 150° C. to about 160° C. and is subsequently sheeted-off and fed into an extruder or onto a calender. A similar polymer containing no polyethylene cannot be processed on the mill because it adheres to the rolls.

EXAMPLE 4

About 1360 parts (1.36 equivalents) of a polypropylene ether glycol having a molecular weight of about 2000 and a hydroxyl number of about 56, about 250 parts (0.25 equivalents) of a trihydric polypropylene ether obtained from propylene oxide condensed with glycerine to a molecular weight of about 3,000 and having a hydroxyl number of about 56, about 126 parts (2.80 equivalents) of 1,4-butanediol, about 18 parts (2.0 equivalents) of water, about 533 parts (6.09 equivalents) of an isomeric mixture of 80% 2,4-toluylene diisocyanate and 20% 2,6-toluylene diisocyanate and about 8.0 parts of stannous octoate are mixed together by means of a high speed propeller-type agitator for about 30 seconds. The mixture is then poured into a polypropylene tray and placed in an oven maintained at about 90° C. for about 2 hours to insure complete reaction. The reaction mixture initially foams and shortly thereafter within about 10 to 15 minutes collapses to yield a millable polyurethane gum. The gum is then milled on any suitable mill such as used in the rubber industry and cured with the addition of 7.5 parts of toluylene diisocyanate dimer per 100 parts of the gum. At this point, about 1.5 parts of polyethylene having a melt index of about 2500 under condition (1) are also added and the gum is milled at about 280° C. for about 3 minutes or until the isocyanate and the polyethylene are substantially uniformly dispersed therein. The cured product is sheeted off of the mill, cut into strips, fed into the hopper of an extruder and forced through a dye to form strands which are then chopped into pellets. These pellets are then injection molded and heated in an oven to effect a final curing of the polyurethane. The superior lubricity obtained in the course of this processing due to the addition of polyethylene was readily apparent, and it facilitated the manufacture of injection molded products to a large extent.

EXAMPLE 5

To about 100 parts of a liquid hydroxyl polyester having a molecular weight of about 2000, an hydroxyl number of about 56, and an acid number of less than 2, prepared by reacting 10 mols of adipic acid and 11 mols of 1,4-butanediol is added about 2% of polyethylene powder having a molecular weight of about 2000 and a melt index of about 10,000 under condition (2), about 33 parts of p-phenylene-bis-($\beta$ - hydroxyl - ethylether). After dispersion of the polyethylene in the polyester, about 60 parts of 4,4'-diphenyl methane diisocyanate are mixed therewith. Prior to mixing these ingredients, each is separately heated to a temperature of about 105° C. On the addition of the isocyanate to the polyester mixture, mechanical mixing is conducted for a period of about 1 minute to insure the intimate contact of the ingredients. The reaction mixture is then cast into a gear mold and maintained at a temperature of about 110° C. to about 115° C. for about 15 minutes or until it is completely cured. On removal of the gears from the mold, superior release is noted.

EXAMPLE 6

To about 100 parts of a hydroxyl polyester having a molecular weight of about 2000, a hydroxyl number of about 56, and an acid number of less than 2, prepared by reacting about 10 mols of adipic acid and about 11 mols of 1,4-butanediol, are added about 33 parts of p-phenylene-bis-($\beta$-hydroxylethylether). After mixing, about 60 parts of 4,4'-diphenylmethane diisocyanate are added. Prior to mixing these ingredients, each is separately heated to a temperature of about 105° C. On the addition of the isocyanate to the polyester mixture, mechanical mixing is conducted for a period of about 1 minute to insure the intimate contact of the ingredients. This reaction mixture is then cast onto a heated table and maintained at a temperature of about 110° C. to about 115° C. for about 7 to about 8 minutes. When the reaction mixture solidifies to the point where it can be readily removed and easily chopped, it is removed from the heated table and permitted to come to room temperature. The material is then split into two portions. One portion is physically blended with about 1% of a polyethylene having a molecular weight of about 2000 and a melt index of about 10,000 under condition (2) and the other portion is processed without any additive. Each portion is then processed separately in a Banbury mixer at about 205° C. and then tested for melt flow on a capillary rheometer, as previously described under condition (2). The portion mixed with polyethylene gives a melt flow of about 8 to 10, while the portion containing no polyethylene gives a melt flow of about 0.8 to about 1.0, illustrating an advantageous increase in the melt flow when polyethylene is used as an internal lubricant in polyurethanes.

EXAMPLE 7

A solid reaction mixture is prepared as in Example 6 and cast onto a table heated at about 110° C. to about 115° C. After the polyurethane is chopped and removed from the table, it is allowed to come to room temperature, and admixed with about 1.25% of polyethylene having a melt index of about 2,500 under condition (1). This mixture is then homogenized by extrusion into particulate strands, and the strands are subsequently cut into pellets. The pellets showed a 5- to 6-fold increase in melt flow over a similarly treated polyurethane containing no polyethylene. The polymer pellets containing polyethylene are then converted to usable products by injection molding e.g., top lifts for lady's shoes or dust covers for ball joints, and improvements in the quality of such parts and in release from the mold cavities are observed, as compared to a similarly processed polymer containing no polyethylene.

It is to be understood that other compounds containing active hydrogen containing groups as set forth in the specification may be substituted for those utilized in the working examples. Also, any of the other organic polyisocyanates and chain extending agents previously set forth in the specification may be used in place of those specifically named in the working examples.

Although the invention has been described in considerable detail for the purposes of illustration, it is to be understood that variations may be made therein by those skilled in the art without departing from the spirit and scope of the invention except as set forth in the claims.

What is claimed is:

1. As a new composition of matter a polyurethane polymer having a Shore hardness of between about 75–A and about 60–D in which is substantially uniformly dispersed about 0.2% to about 5% by weight based on the total weight of polyurethane elastomer of a chemically inert lubricating agent selected from the group consisting of polyolefins derived from olefins having 2 to 4 carbon atoms, polystyrene and mixtures thereof, said lubricating agent having a melt index of at least about 115.

2. As a new composition of matter a polyurethane polymer having a Shore hardness of between about 75–A and about 60–D in which is substantially uniformly dispersed about 0.2% to about 5% by weight based on the total weight of polyurethane elastomer of a chemically inert lubricating agent selected from the group consisting of polyolefin derived from olefins having 2 to 4 carbon atoms, polystyrene and mixtures thereof, said lubricating agent having a melt index of at least about 1000.

3. As a new composition of matter a polyurethane polymer having a Shore hardness of between about 75–A and about 60–D and prepared by reacting an organic compound having at least two active hydrogen containing groups as determined by the Zerewitinoff method, said organic compound having a molecular weight of at least about 600, with an organic polyisocyanate, and adding thereto from about 0.2% to about 5% by weight based on the total weight of polyurethane elastomer of a chemically inert lubricating agent selected from the group consisting of polyolefin derived from olefins having 2 to 4 carbon atoms, polystyrene and mixtures thereof, said lubricating agent having a melt index of at least about 115.

4. As a new composition of matter a solid polyurethane polymer having a Shore hardness of between about 75–A and about 60–D and prepared by reacting a polyisocyanate prepolymer with a chain extender, said chain extender containing at least 2 active hydrogen containing groups as determined by the Zerewitinoff method and having a molecular weight of less than about 500, wherein about 0.2% to about 5% by weight based on the total weight of polyurethane elastomer of a chemically inert lubricating agent is substantially uniformly dispersed, said lubricating agent being a member selected from the group consisting of polyolefin derived from olefins having 2 to 4 carbon atoms, polystyrene and mixtures thereof, said lubricating agent having a melt index of at least about 115.

5. As a new composition of matter a solid polyurethane polymer having a Shore hardness of between about 75–A and about 60–D and prepared by reacting an organic compound containing at least 2 active hydrogen containing groups as determined by the Zerewitinoff method, said organic compound having a molecular weight of at least about 600, and selected from the group consisting of hydroxyl polyesters prepared by reacting a polyhydric alcohol with a polycarboxylic acid, polyhydric polyalkylene ether, polyhydric polythioether and polyacetals with an organic polyisocyanate and a chain extender containing at least 2 active hydrogen containing groups and having a molecular weight of less than about 500, and containing from about 0.2% to about 5% by weight based on the total weight of polyurethane elastomer of a chemically inert lubricating agent selected from the group consisting of polyolefin derived from olefins having 2 to 4 carbon atoms, polystyrene and mixtures thereof, said lubricating agent having a melt index of at least about 115.

6. The composition of claim 4 in which the chain extender is 1,4-phenylene-bis-(β-hydroxyethylether).

7. The composition of claim 4 in which the chain extender is 1,4-butanediol.

8. The composition of claim 1 in which the polyolefin is a member selected from the group consisting of polyethylene, polypropylene and polybutylene.

9. The composition of claim 4 in which the polyolefin is a member selected from the group consisting of polyethylene, polypropylene and polybutylene.

10. The composition of claim 4 in which the diisocyanate is tolylene diisocyanate.

11. The composition of claim 4 in which the diisocyanate is 4,4'-diphenylmethane diisocyanate.

12. A method for making a polyurethane adapted to be shaped which comprises mixing a polyurethane composition having a Shore hardness between about 75–A and about 60–D with about 0.2% to about 5% by weight based on the total weight of polyurethane elastomer of a chemically inert polymer having a melt index of at least about 115 and selected from the group consisting of polyolefins derived from olefins having 2 to 4 carbon atoms, polystyrenes, and mixtures thereof.

13. A method for shaping and curing a polyurethane which comprises charging a shaping device with an uncured internally lubricated polyurethane composition having a Shore hardness of between about 75–A and about 60–D prepared by dispersing particles of about 0.2% to 5% by weight based on the total weight of polyurethane elastomer of a chemically inert lubricating agent selected from the group consisting of polyolefins derived from olefins having 2 to 4 carbon atoms, polystyrenes, and mixtures thereof substantially uniformly therein, said lubricating agent having a melt index of at least about 115, and thereafter curing the polyurethane composition while it has the shape of the shaping device.

14. A method for improving the melt flow and mold release properties of polyurethane elastomers which comprises mixing together an organic polyisocyanate, an organic compound having hydrogen atoms reactive with isocyanato groups and a molecular weight of at least about 600, an hydroxyl number of not more than about 185 and an acid number of less than about 2, and a chain extender and reacting the mixture until a solid thermoplastic polyurethane is obtained, and thereafter shaping and curing the said polyurethane, the improvement which comprises dispersing about 0.2% to 5% by weight based on the total weight of polyurethane elastomer of a chemically inert lubricating agent selected from the group consisting of polyolefins derived from olefins having 2 to 4 carbon atoms, polystyrenes and mixtures thereof in a polyurethane having a Shore hardness between about 75–A and about 60–D prior to shaping and curing, said lubricating agent having a melt index of at least about 115.

15. A method of improving the melt flow and mold release properties of polyurethane elastomer compositions having a Shore hardness of between about 75–A and about 60–D which comprises incorporating therein about 0.2% to about 5% by weight based on the total weight of polyurethane elastomer of a chemically inert lubricating egent selected from the group consisting of polyolefin derived from olefins having 2 to 4 carbon atoms, polystyrene, and mixtures thereof, said lubricating agent having a melt index of at least about 115.

16. A method of improving the melt flow and mold release properties of polyurethane elastomer compositions which comprises incorporating about 0.2% to about 5% by weight based on the total weight of polyurethane elastomer weight of a chemically inert lubricating agent selected from the group consisting of polyolefin derived from olefins having 2 to 4 carbon atoms, polystyrene and mixtures thereof into the components of the reaction mixture in the preparation of the polyurethane elastomer, said lubricating agent having a melt index of at least about 115.

17. In a method for improving the melt flow and mold release properties of polyurethane elastomer compositions having a Shore hardness of between about 75–A and about 60–D which comprises mixing together an organic polyisocyanate, an organic compound having hydrogen atoms reactive with isocyanato groups and a molecular weight of at least about 600, an hydroxyl number of not more than about 185 and an acid number of less than about 2, and reacting the mixture until a millable polyurethane gum is obtained which is thereafter treated with additional polyisocyanate, the improvement which comprises mixing the polyurethane with about 0.2% to about 5% by weight based on the total weight of polyurethane elastomer of a chemically inert lubricating agent selected from the group consisting of polyolefin derived from olefins having 2 to 4 carbon atoms, polystyrene and mixtures thereof until the said lubricating agent, having a melt index of at least about 115 is substantially uniformly dispersed therein, sheeting off the polyurethane and shaping it.

18. In a method for improving the melt flow and mold release properties of polyurethane elastomeric compositions having a Shore hardness of between about 75–A and about 60–D which comprises mixing together an organic polyisocyanate, an organic compound having hydrogen atoms reactive with isocyanato groups and a molecular weight of at least about 600, an hydroxyl number of not more than about 185, and an acid number of less than about 2, and a chain extender and pouring the reaction mixture onto a surface and curing it to a solid form, the improvement which comprises scoring the polyurethane and feeding it into a mixer together with 0.2% to 5% by weight based on the total weight of polyurethane elastomer of a chemically inert lubricating polymer selected from the group consisting of polyolefin derived from olefins having 2 to 4 carbon atoms, polystyrene and mixtures thereof, said lubricating polymer having a melt index of at least about 115, wherein these materials are mixed to effect a blend.

19. In a method for improving the melt flow and mold release properties of polyurethane elastomer compositions having a Shore hardness of between about 75–A and about 60–D which comprises mixing together an organic polyisocyanate, an organic compound having hydrogen atoms reactive with isocyanato groups and a molecular weight of at least about 600, an hydroxyl number of not more than about 185 and an acid number of less than about 2, and a chain extender and pouring the reaction mixture onto a surface and curing it to a solid form, the improvement which comprises scoring the polyurethane and feeding it into a mixer together with about 0.2% to about 5% by weight based on the total weight of polyurethane elastomer of a chemically inert lubricating agent selected from the group consisting of polyolefin derived from olefins having 2 to 4 carbon atoms, polystyrene and mixtures thereof, said lubricating agent having a melt index of at least about 115 and mixing these materials to effect a blend which is then fed into the hopper of an extruder to produce plurality of strands which are pelletized for shaping and molding processes.

20. The method of claim 13 wherein the polyolefin is a member selected from the group consisting of polyethylene, polypropylene and polybutylene.

21. The method of claim 15 wherein the polyolefin is a member selected from the group consisting of polyethylene, polypropylene and polybutylene.

References Cited

FOREIGN PATENTS 631,690 11/1961 Canada.
936,741 9/1963 Great Britain.
1,351,448 12/1963 France.

GEORGE F. LESMES, *Primary Examiner.*

MURRAY TILLMAN, *Examiner.*

PAUL LIEBERMAN, *Assistant Examiner.*